May 28, 1957 J. G. HABERKOST 2,794,148
DEFLECTION CIRCUIT FOR CATHODE RAY TUBES
Filed Oct. 11, 1954
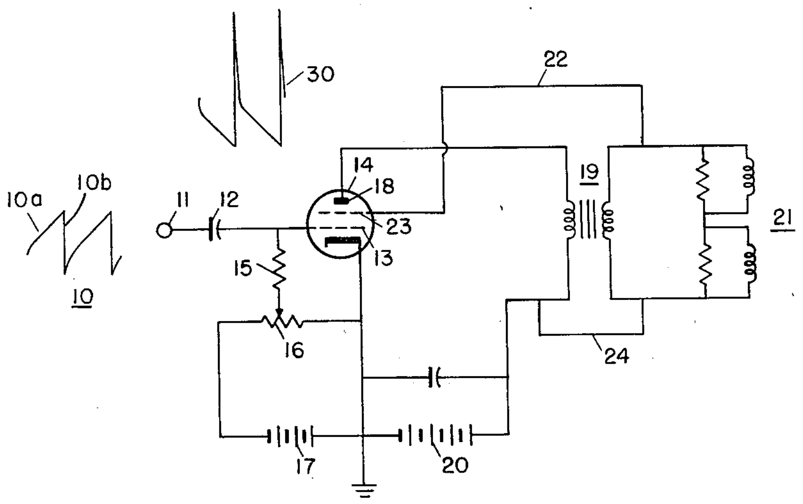
INVENTOR.
JEROME G. HABERKOST
BY Darby & Darby
ATTORNEYS United States Patent Office 2,794,148

Patented May 28, 1957

2,794,148

DEFLECTION CIRCUIT FOR CATHODE RAY TUBES

Jerome G. Haberkost, Preakness, N. J., assignor to Allen B. Du Mont Laboratories, Inc., Clifton, N. J., a corporation of Delaware Application October 11, 1954, Serial No. 461,367

5 Claims. (Cl. 315—27)

The present invention relates to deflection circuits for cathode ray tubes and particularly to deflection circuits utilizing magnetic deflection means.

More particularly still the invention relates to circuits for the vertical deflection coils of cathode ray tubes.

As is well known, when an electrical circuit containing inductance is interrupted, high voltages are induced. Since the coupling transformer and the coils of the deflection yoke of a cathode ray tube are inductive, high induced voltages are generated in the circuit as the sweep signals are applied to the circuit. The present trend is toward deflection yokes having coils of higher inductances and transformers having higher ratios of primary to secondary turns, thus making the problem of high induced voltage more acute.

In many instances heretofore this condition has been tolerated even though it required better insulation, higher quality tube sockets, and electron tubes with a high inverse voltage rating.

In other instances attempts have been made to minimize the condition by the use of resistors or capacitors across the deflection circuit transformer windings. However, the use of such resistors or capacitors has brought disadvantages. One of these disadvantages is that power is wasted in the resistors and another disadvantage, and perhaps a more serious one, is that oscillations will be set up, the frequency of oscillation being determined by the values of inductance, stray capacitance and the value of the added capacitors. The effect of these oscillations in the vertical deflection circuit was to stretch the top of the picture on the cathode ray tube thus producing that type of distortion known as vertical nonlinearity.

The present invention replaces the usual triode, the output of which is coupled to the coupling transformer of the deflection circuit, with a tetrode having a screen grid. The invention also provides a connection from the deflection coils to the screen grid of the tetrode to thereby increase the voltage applied to the screen grid at the cutoff and limit the peak of the induced high voltage to a relatively low value which does not require the expensive insulation, tube sockets and electron tubes which have heretofore been required. This invention furthermore, since it does not utilize any capacitors and resistors, does not attempt to overcome the problem of high induced voltages by injecting another problem, namely, that of oscillation and vertical non-linearity.

It is an object of the invention to provide a cathode ray tube deflection circuit which reduces the effective induced voltage otherwise encountered.

It is another object of the invention to permit the use of electron tubes of lower inverse voltage rating and of less expensive insulation and tube sockets.

It is another object of the invention to provide a circuit which reduces the effective induced voltage without at the same time inserting resistors or capacitors or both and therefore without causing power waste or vertical nonlinearity of the picture produced by the cathode ray tube.

Other objects and features of the invention will be apparent when the following description is considered in connection with the annexed drawing in which the single figure is a schematic diagram of the circuit of the instant invention.

In describing the circuit in detail the terms "upvolting" and "downvolting" are used. These terms are defined as follows. "Upvolting" means raising the potential, but not necessarily to a positive value, and "downvolting" means lowering the potential, but not necessarily to a negative value.

Referring now to the drawing, a waveform 10 of the usual saw-tooth shape is applied to input terminal 11 and thence through blocking capacitor 12 to the control grid 13 of electron tube 14. This waveform has a slowly rising portion **10*a* and a precipitously decreasing portion 10*b*. Resistor 15 in conjunction with potentiometer 16 and voltage source 17 serves to apply the proper biasing voltage to control grid 13. The amplified inverted version of input waveform 10 is shown at 30 and appears at the anode 18 of tube 14 which anode is connected in series with the primary winding of the coupling transformer 19 and source of potential 20**.

Since the turns-ratio of transformer 19 is between 10:1 and 25:1, the voltage at the secondary winding is proportionately reduced and is then applied to the vertical coils 21 of the deflection yoke. A turns-ratio value of the order mentioned is required in order to properly match the impedance of the tube and the transformer primary on one hand and the impedance of the secondary and the yoke coils on the other. In some instances it may be desirable to use an auto-transformer in which the primary and secondary windings are interconnected. However, the use of such an auto-transformer produces the same conditions described above.

During the slowly upvolting portion **10*a* of input waveform 10 a slowly increasing current appears in coils 21. However, when the precipitous portion 10*b* of the input waveform is applied to control grid 13, tube 14 is suddenly cut off and the magnetic fields in the transformer 19 and coils 21 quickly collapse. This induces a high voltage which is frequently of the order of 2000 volts or more and which is of course impressed on anode 14. This condition requires high quality insulation of the transformer and the tube sockets and also requires an electron tube 14** with a high inverse voltage rating.

As indicated hereinabove this condition has been tolerated and the tubes and sockets made of a quality to withstand the voltages mentioned, or in some instances, resistors or capacitors were utilized across the windings but with the disadvantage of power loss or vertical nonlinearity or both. The instant invention provides a connection 22 to the screen grid 23 of tube 14 together with a connection 24 from the secondary of transformer 19 to the voltage source 20 and through it in the usual manner to the cathode of tube 14. Thus the increasing induced voltage is applied to the screen grid of tube 14 and, despite the fact that the control grid 13 has been downvolted to the cutoff point, the higher voltage impressed on the screen grid 23 permits tube 14 to conduct. Due to this conduction the circuit through the primary winding of transformer 19 is completed and energy is absorbed during the transient state of induced high voltage. Therefore, instead of the potential at the anode 18 building up to the order of 2000 volts it is limited to 1000 volts or less and this without the use of resistors or capacitors and therefore without loss of power during the sweep portion of the cycle and without the production of oscillations resulting in vertical non-linearity of the picture.

Although a single embodiment of the invention has been disclosed, it is obvious that modifications may be made without departing from the scope of the invention. I wish, therefore, to be limited not by the foregoing specification but, on the contrary, solely by the claims granted to me.

What is claimed is:

1. A deflection circuit for cathode ray tubes having magnetic deflection coils comprising, in combination, an electron tube having a cathode, a control grid, a screen grid and an anode, means for applying a sweep signal to the control grid of said tube, a coupling transformer having its primary winding connected in the anode circuit of said tube and its secondary winding connected to the deflection coils of the cathode ray tube, and a direct connection from the said coupling transformer secondary to the screen grid of the electron tube to apply a positive potential during retrace whereby said electron tube is continued conductive after said tube is biased to cutoff by said sweep signal input to said control grid and said prolongation of conduction prevents application of the high voltage induced by collapse of the magnetic field of the deflection coils and said transformer windings to said anode of said electron tube.

2. A vertical deflection circuit for cathode ray tubes having magnetic deflection coils comprising, in combination, an electron tube having a cathode, a control grid, a screen grid and an anode, means for applying a sweep signal to the control grid-cathode circuit of said tube, a coupling transformer having its primary winding connected in the anode-cathode circuit of said tube and its secondary connected to the vertical deflection coils of a cathode ray tube, a direct connection from one end of said secondary winding to the screen grid of said electron tube and a connection from the other end of said secondary winding to the cathode of said electron tube whereby when said sweep signal biases said electron tube to cutoff, high voltages are induced in said transformer winding and deflection coils due to the collapse of the magnetic field therein, a positive voltage is applied to said screen grid cathode circuit to continue said tube conductive and to prevent the application of high voltage from said coupling transformer primary winding to the anode-cathode circuit of the said electron tube.

3. A deflection circuit as claimed in claim 2, characterized in that the deflection coils of the cathode ray tube are connected in series across the secondary winding of said transformer and further characterized in that the junction of one of the deflection coils and said transformer secondary is connected to said screen grid of said electron tube and the junction of the second of the deflection coils with said transformer secondary is connected to the cathode of said electron tube.

4. A circuit as claimed in claim 3, characterized in that said coupling transformer is a step-down transformer having a turns ratio in the range of from 10:1 to 25:1.

5. In a cathode ray tube deflection circuit including a magnetic deflection system and a deflection tube having a screen grid, the improvement comprising: a direct connection between the vertical deflection coil of said deflection system and said screen grid, said connection being phased to apply a positive potential to said screen grid during retrace.

References Cited in the file of this patent

UNITED STATES PATENTS

| | | |
|---|---|---|
| 2,579,627 | Tourshou | Dec. 25, 1951 |
| 2,589,299 | Setchell | Mar. 18, 1952 |
| 2,627,052 | Helpert et al. | Jan. 27, 1953 |
| 2,627,588 | Knight | Feb. 3, 1953 |
| 2,658,163 | De Cola | Nov. 3, 1953 |
| 2,697,798 | Schlesinger | Dec. 21, 1954 |